(12) United States Patent
Petit et al.

(10) Patent No.: US 10,377,630 B2
(45) Date of Patent: Aug. 13, 2019

(54) OXYGEN PRODUCTION PROCESS OF VSA TYPE WITH PERIOD REGENERATION

(71) Applicant: L'Air Liquide, Société Anonyme pour l'Etude et l'Exploitation des Procédés Georges Claude, Paris (FR)

(72) Inventors: Pierre Jean Louis Petit, Chatenay Malabry (FR); Christian Monereau, Montpellier (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 120 days.

(21) Appl. No.: 15/597,457

(22) Filed: May 17, 2017

(65) Prior Publication Data

US 2018/0079644 A1   Mar. 22, 2018

(30) Foreign Application Priority Data

May 18, 2016   (FR) ..................... 16 54390

(51) Int. Cl.
*B01D 53/047* (2006.01)
*C01B 13/02* (2006.01)
*B01D 53/04* (2006.01)

(52) U.S. Cl.
CPC ...... *C01B 13/0259* (2013.01); *B01D 53/0438* (2013.01); *B01D 53/0476* (2013.01);
(Continued)

(58) Field of Classification Search
CPC ........... B01D 53/0438; B01D 53/0476; B01D 2253/108; B01D 2256/12;
(Continued)

(56) References Cited

U.S. PATENT DOCUMENTS 4,299,595 A * 11/1981 Benkmann ........... B01D 53/047
   95/1
5,463,869 A   11/1995 Kumar et al.
(Continued)

FOREIGN PATENT DOCUMENTS

EP   1 095 689   5/2001
EP   1 155 729   11/2001
(Continued)

OTHER PUBLICATIONS

French Search Report and Written Opinion for corresponding FR 1654390, dated Jan. 31, 2017.

*Primary Examiner* — Frank M Lawrence, Jr.
(74) *Attorney, Agent, or Firm* — Elwood L. Haynes

(57) ABSTRACT

Oxygen production process of VSA type from a flow of air, implementing at least one group of at least 3 adsorbers installed in parallel and following the same VSA cycle comprising, in succession, a phase of adsorption at the high pressure of the cycle, a phase of desorption at pressures lower than the high pressure of the cycle, a phase of repressurization of the adsorber to the high pressure of the cycle, characterized in that, periodically or exceptionally: a) at least one adsorber of the group of adsorbers is isolated so as to no longer follow the pressure cycle, b) the adsorbent contained in the adsorber isolated in the step a) is regenerated by raising the temperature, and c) the adsorber regenerated in the step b) is re-incorporated in the group of adsorbers so as to once again follow the pressure cycle.

13 Claims, 5 Drawing Sheets

(52) U.S. Cl.
CPC .... *B01D 2253/108* (2013.01); *B01D 2256/12* (2013.01); *B01D 2257/102* (2013.01); *B01D 2259/403* (2013.01); *B01D 2259/4006* (2013.01); *B01D 2259/4009* (2013.01); *B01D 2259/4061* (2013.01); *C01B 2210/0014* (2013.01); *C01B 2210/0048* (2013.01); *C01P 2006/80* (2013.01)

(58) Field of Classification Search
CPC ...... B01D 2257/102; B01D 2259/4006; B01D 2259/4009; B01D 2259/403; B01D 2259/4061; C01B 13/0259; C01B 2210/0014; C01B 2210/0048; C01P 2006/80
USPC ..................................... 95/96–102, 106, 130
See application file for complete search history.

(56) References Cited

U.S. PATENT DOCUMENTS

| 6,517,609 | B1 | 2/2003 | Monereau et al. |
| 7,025,801 | B2* | 4/2006 | Monereau ............ B01D 53/047 95/11 |
| 2005/0051029 | A1* | 3/2005 | Lloyd ................ B01D 53/0431 96/109 |
| 2007/0137487 | A1* | 6/2007 | Whitley ............ B01D 53/0415 96/121 |
| 2010/0024641 | A1* | 2/2010 | Monereau ............ B01D 53/04 95/93 |

FOREIGN PATENT DOCUMENTS

| JP | S55 27034 | 2/1980 |
| WO | WO 02 47797 | 6/2002 |

\* cited by examiner

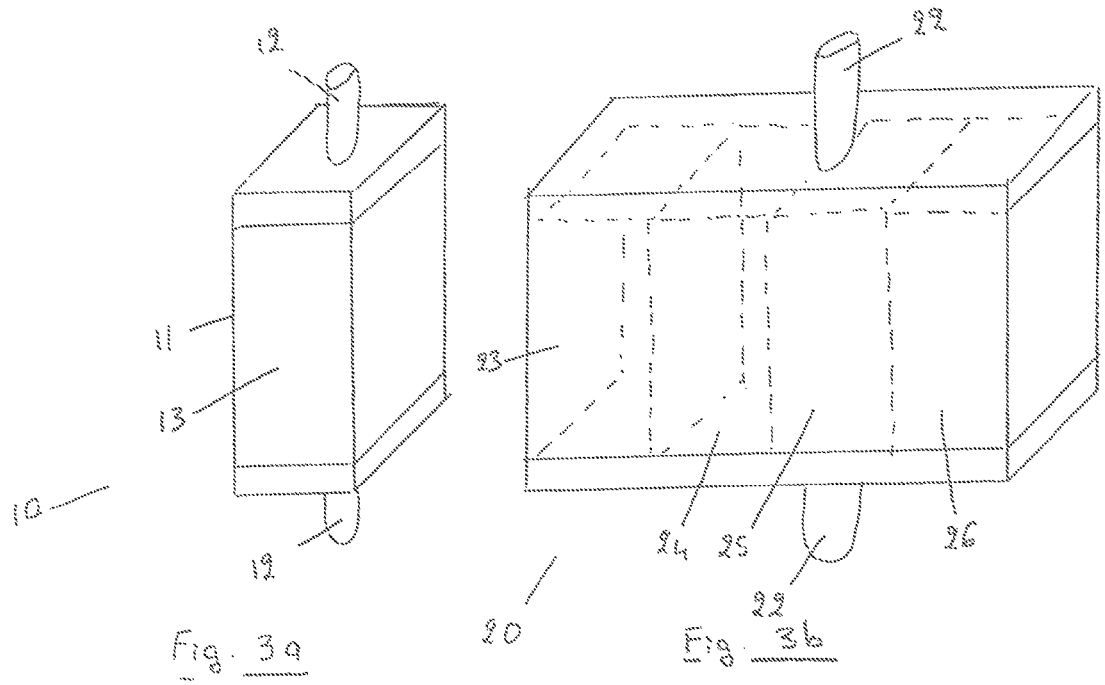
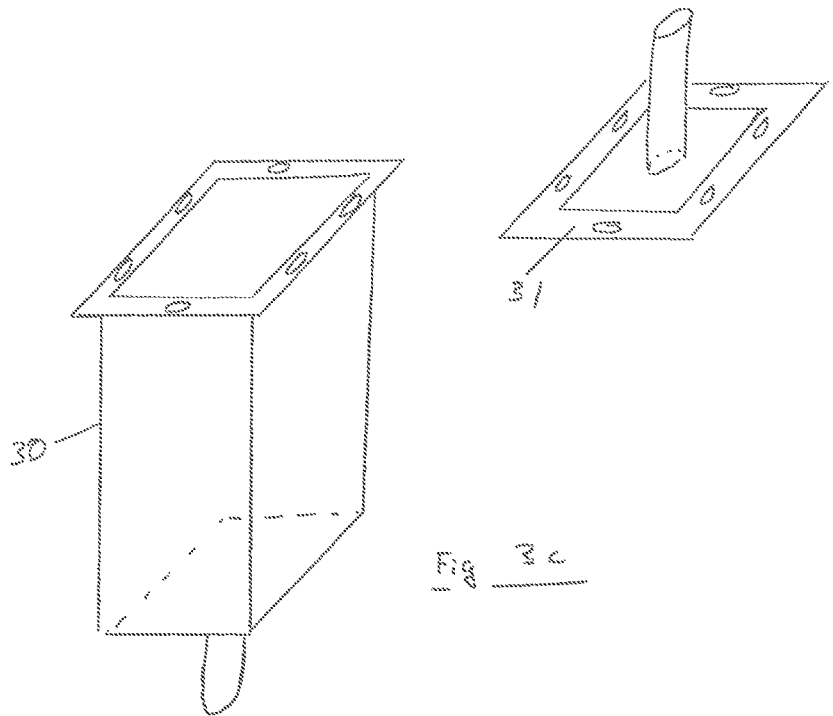

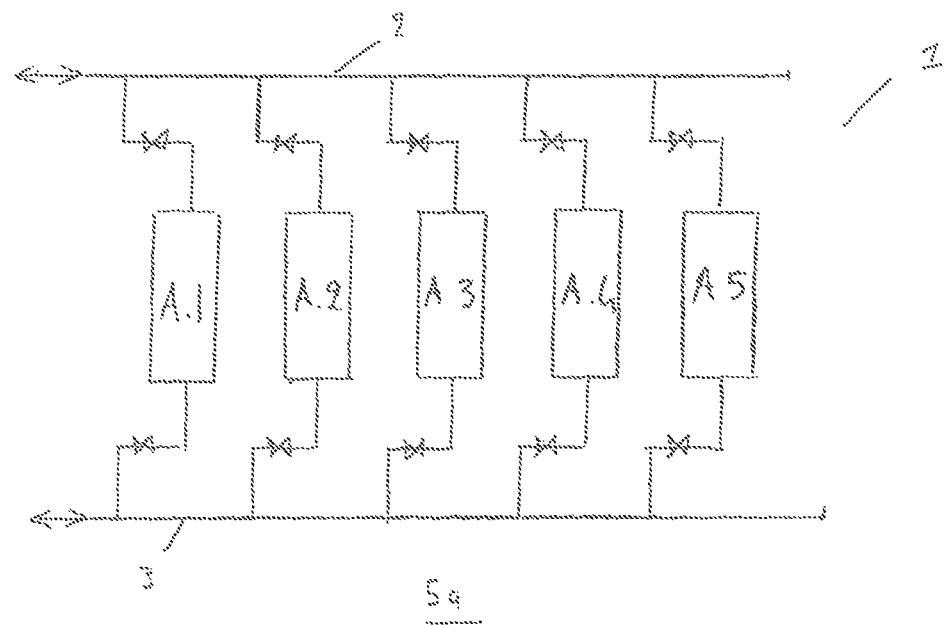
5a
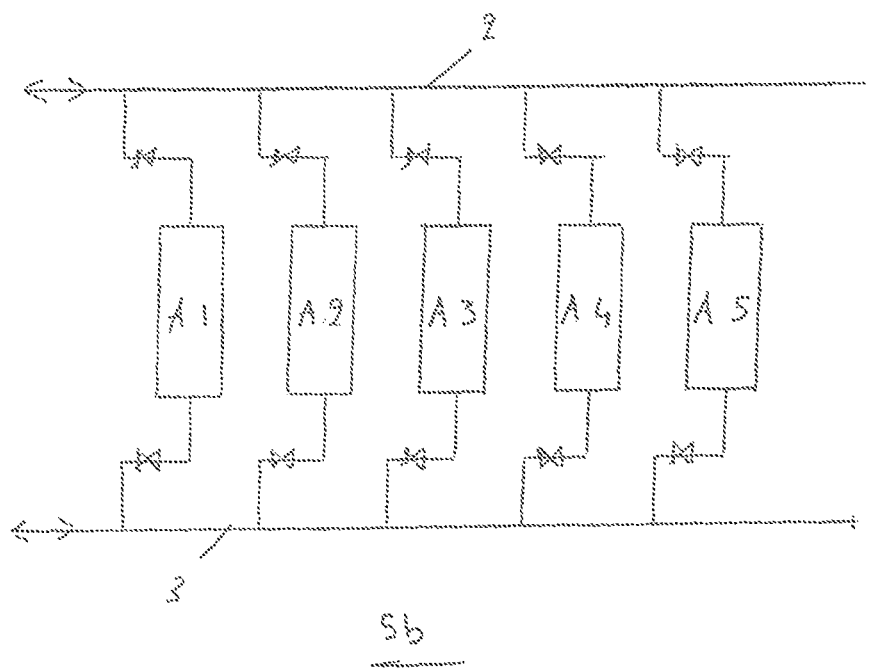
5b
Figure 5

OXYGEN PRODUCTION PROCESS OF VSA TYPE WITH PERIOD REGENERATION

CROSS REFERENCE TO RELATED APPLICATIONS

This application claims the benefit of priority under 35 U.S.C. § 119 (a) and (b) to French Patent Application No. 1654390 filed May 18, 2016, the entire contents of which are incorporated herein by reference.

BACKGROUND

The present invention relates to an oxygen production process of VSA (vacuum swing adsorption) type comprising a periodic or exceptional regeneration.

The production of oxygen from atmospheric air by units of PSA (pressure swing adsorption) type has undergone a significant expansion in recent decades. Improvements have been made to the adsorbents, the technology and the process itself.

Generally, the terms PSA are used to designate any gas purification or separation process implementing a cyclical pressure swing experienced by the adsorbent between a high pressure, called adsorption pressure, and a low pressure, called regeneration pressure. Thus, this generic designation of PSA is employed indifferently to designate the following cyclic processes, to which it is also common practice to give more specific names based on the pressure levels involved or on the time needed for an adsorber to return to its initial point (cycle time):

The VSA processes in which the adsorption is performed substantially at atmospheric pressure, preferentially between 0.95 and 1.25 bar abs and the desorption pressure is lower than atmospheric pressure, typically from 50 to 400 mbar abs.

The MPSA or VPSA processes in which the adsorption is performed at a high pressure higher than atmospheric pressure, typically between 1.35 and 6 bar abs, and the desorption at a low pressure lower than atmospheric pressure, generally between 200 and 650 mbar abs.

The actual PSA processes in which the high pressure is substantially higher than atmospheric pressure, typically between 3 and 50 bar abs and the low pressure substantially equal to or higher than atmospheric pressure, generally between 1 and 9 bar abs.

The RPSA (rapid PSA) processes for which the duration of the pressure cycle is typically less than one minute.

The URPSA (ultra rapid PSA) processes for which the duration of the pressure cycle is of the order of at most a few seconds.

With the above definitions, the present invention relates equally to the VSA and VPSA processes.

In order to simplify the text, only the term VSA will be employed to encompass the scope of the invention as has just been defined. It will be recalled that it concerns more specifically a VSA O2 unit producing oxygen (generally 85 to 95% molar and more often than not 90 to 93% mol.).

Whatever the type of PSA, an adsorber will begin an adsorption period until it is loaded into the constituent or constituents to be stopped at the high pressure then will be regenerated by depressurization and extraction of the adsorbed compounds before being reconditioned, in practice repressurized, to recommence a new adsorption period. The adsorber has then performed a "pressure cycle" and the very principle of the PSA process is to string together these cycles one after the other; it is therefore a cyclic process. The time that an adsorber takes to revert to its initial state is called cycle time (Tc). In principle, each adsorber follows the same cycle with a time offset that is called time phase (Tp) or more simply phase. A PSA process therefore involves N volumes of adsorbent following the same cycle and offset in time by Tp=Tc/N.

There are a large number of possible cycles for the VSA O2 units that it is pointless to list here.

The most commonplace industrial cycles comprise 1 to 4 adsorbers, that is to say from 1 to 4 unitary volumes of adsorbent.

Unlike many processes, in the case of oxygen production, the raw material, that is to say the atmospheric air, is free and the energy consumption of the unit is one of the important, even predominant items in the oxygen production cost, particularly in the case of a high production, for example greater than 120 tons/day, in which, because of the scale effect, the weight of the investment rounded to the nearest Nm3 of oxygen produced is lesser.

Because of this, the lesser gain on the specific energy is advantageous because it directly and substantially affects the production costs.

One of the basic trends is therefore to use adsorbents increasingly specific to N2/O2 separation, that is to say exhibiting the best N2/O2 selectivity combination, N2 capacity, kinetic energy . . . and to possibly manage the thermal effects to approximate an optimal isothermal operation.

Since these specific adsorbents have a high cost compared to the more basic adsorbents (such as a zeolite of calcium A type for example), another trend for limiting the investment and thereby the overall cost of production of the oxygen is naturally to reduce the quantity needed thereof by using in particular increasingly shorter cycles.

This trend began several years ago and one of the major problems was very soon identified: the less adsorbent that is used, the greater the risk of pollution to which is added the fact that the more specific zeolites that have just been mentioned are, per contra, increasingly sensitive to this pollution. It should actually be noted that the adsorbent volume has decreased much more than the quantity of air introduced per hour, for a given O2 production. The oxygen extraction efficiency—around 50/60%—has changed relatively little compared to the reduction of the volume of adsorbent.

It is therefore commonplace on the industrial VSA O2 units to change the adsorbent after 4 or 5 years of service to restore the initial performance levels. The zeolite is generally shipped to the supplier who reactivates it, reconditions it and makes it available once more to the industry. This load will generally be used to subsequently fill another new unit or a unit being cleaned.

It is enough to have a sufficient load of zeolite available in advance to perform the replacement in relatively short lead times, of the order of a week for example.

Nevertheless, such a procedure has a relatively high cost and presents risks. To the cost of downtime of a load of adsorbent, must be added the draining, storage, transportation, reactivation and filling. During handling operations on site and in the factory, 5 to 10% of the product is lost and has to be replaced with new adsorbent. Most of the risks correspond to the filling during which it is obviously necessary to avoid any entry of moisture. For that, effective means have to be implemented to avoid any prolonged contact between the adsorbent and the moist atmospheric air. Bad weather conditions are likely to delay these filling operations and result in cost overheads.

It is then easy to understand all the interest that there is in finding another way of maintaining, over time, the initial—and maximal—performance levels of a VSA O2 unit, without having to perform the periodic change of large quantity of adsorbent or without needing to install costly regeneration systems associated with sophisticated dimensionings of large adsorbers capable of withstanding high thermal stresses.

Starting from that, one problem which arises is how to provide an improved VSA O2 process.

SUMMARY

A solution of the present invention is an oxygen production process of VSA type from a flow of air, implementing at least one group of at least 3 adsorbers installed in parallel and following the same VSA cycle comprising, in succession, a phase of adsorption at the high pressure of the cycle, a phase of desorption at pressures lower than the high pressure of the cycle, a phase of repressurization of the adsorber to the high pressure of the cycle, characterized in that, periodically or exceptionally:

a) at least one adsorber of the group of adsorbers is isolated so as to no longer follow the pressure cycle, b) the adsorbent contained in the adsorber isolated in the step a) is regenerated by raising the temperature, and c) the adsorber regenerated in the step b) is re-incorporated in the group of adsorbers so as to once again follow the pressure cycle.

Depending on the case, the process according to the invention may have one or more of the following features:

- said process implements at least 2 groups of at least 3 adsorbers with the groups each following, in offset fashion, the same VSA cycle;
- in the step a) at most a third of the adsorbers of a group is isolated;
- said process implements removable means of connection to air flow, oxygen flow and residual flow circuits;
- the adsorbers are removable and, in the step a), the adsorber is isolated by displacement of said adsorber out of the unit formed by the group of at least 3 adsorbers;
- in the step a) the adsorber is isolated by disconnection of said adsorber with the removable means of connection to the air, oxygen flow and residual flow circuits, and in the step b) the adsorbent is regenerated locally;
- in the step b) the adsorbent is regenerated by circulation of a regeneration gas, counter-current to the direction of air circulation at a temperature above 100° C., preferentially at a temperature above 250° C.;
- said regeneration gas is air, oxygen, nitrogen or a mixture of these gases with a dew point at atmospheric pressure lower than −30° C., preferentially lower than −50° C., more preferentially lower than −70° C.;
- the regeneration gas is heated to a temperature higher than 100° C. by means of an electrical reheater;
- said process implements an additional adsorber and in the step a) the additional adsorber is incorporated in the group of adsorbers so as to follow the pressure cycle in place of the isolated adsorber;
- in the step a) a single adsorber is isolated and the steps a), b) and c) have a total duration of between 8 h and 48 h. For a VSA comprising 4 to 10 adsorbers, performing the steps a), b) and c) for each of the adsorbers would take, in total, between 2 days and 2 weeks;
- the adsorbers implemented consist of a barrel comprising at least one particular adsorbent or at least one contactor with parallel passages, with said barrel having a diameter of between 0.5 and 2.5 m, preferably between 0.8 and 2 m, even more preferentially between 1.0 and 1.5 m;
- the high pressure of the cycle lies between $1\times10^5$ Pa and $1.55\times10^5$ Pa, preferably between $1.2\times10^5$ Pa and $1.35\times10^5$ Pa;
- said process makes it possible to produce between 5 t/d and 240 t/d of oxygen.

The periodic or exceptional regeneration is done locally, that is to say on site, in immediate proximity to the VSA O2 unit, or on the industrial site to which the oxygen production unit is attached, even in a workshop in proximity to the site, without the adsorbent contained in the adsorber being returned to the initial supplier or in an external factory specializing in adsorbent reactivation.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 3a illustrates a schematic representation of adsorbers with outer jackets or enclosures, in accordance with one embodiment of the present invention.

FIG. 3b illustrates a schematic representation of adsorbers with outer jackets or enclosures, in accordance with one embodiment of the present invention.

FIG. 3c illustrates a schematic representation of adsorbers with outer jackets or enclosures, in accordance with one embodiment of the present invention.

FIG. 5a illustrates groups of adsorbers, in accordance with one embodiment of the present invention.

FIG. 5b illustrates groups of adsorbers, in accordance with one embodiment of the present invention.

DESCRIPTION OF PREFERRED EMBODIMENTS

Figure 1:
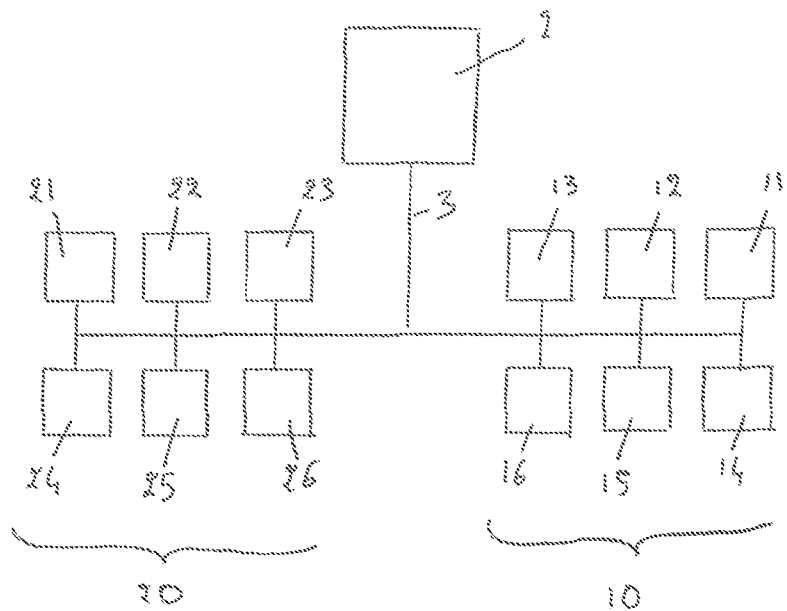
FIG. 1 illustrates a schematic representation of one embodiment of the current invention.

FIG. 1 represents an example of a unit that can be implemented in the process according to the invention. In effect, FIG. 1 represents a unit comprising 2 groups 10 and 20 of 6 adsorbers, a set of compression and pumping machines 2, a set of pipelines and valves 3 making it possible to effect the pressure cycle and to produce oxygen from the atmospheric air. Each of said groups does not constitute a single adsorber as is generally the case, but consists of 6 adsorbers 11 to 16 and 21 to 26 installed in parallel. Inlets and outlets of the adsorbers are linked to the main lines allowing the supply and the extraction of the various flows implemented in the cycle. The connections of the various adsorbers to the main lines are dismantleable (valves, flanges, etc.) and/or isolatable.

Figure 2:
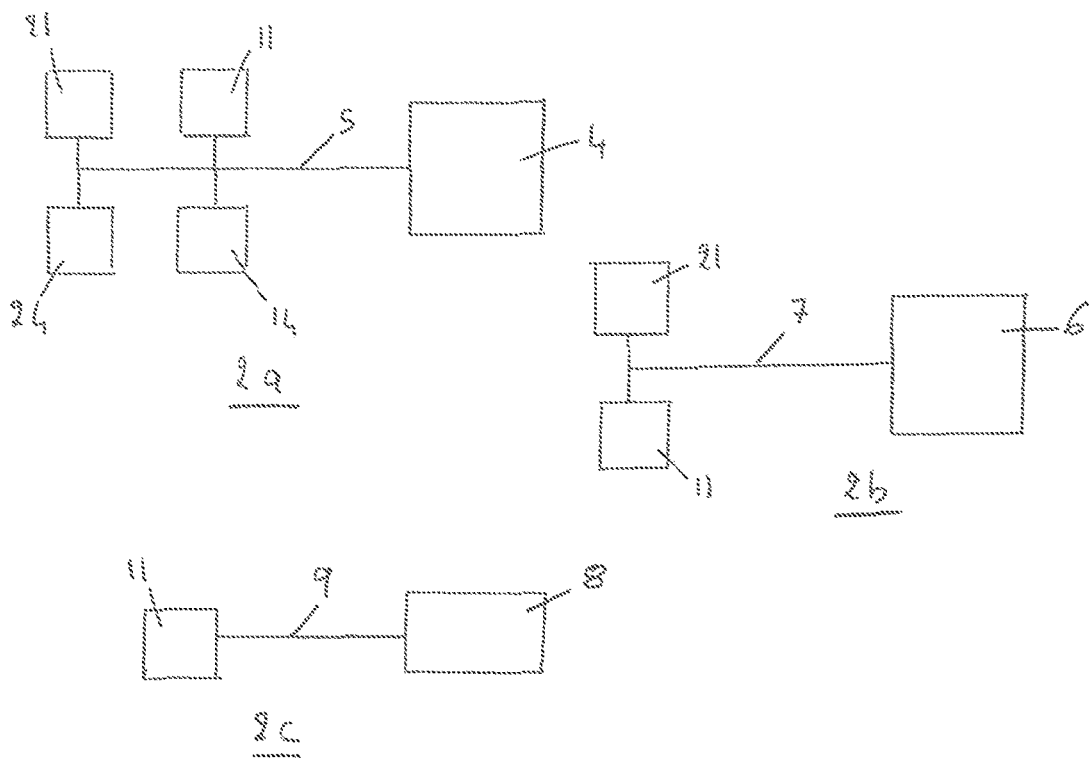
FIG. 2a illustrates a schematic representation of periodic or exceptional regeneration, in accordance with one embodiment of the present invention.
FIG. 2b illustrates a schematic representation of periodic or exceptional regeneration, in accordance with one embodiment of the present invention.
FIG. 2c illustrates a schematic representation of periodic or exceptional regeneration, in accordance with one embodiment of the present invention.

FIG. 2 represents 3 cases of periodic or exceptional regeneration according to the invention that can take place within the unit represented in FIG. 1.

The case 2a represents the maximum case in which a third of the adsorbers of each group is regenerated by raising the temperature. In effect, the adsorbers 11, 14 on the one hand and 21, 24 on the other hand are disconnected from the unit and regenerated by circulation of a hot gaseous flow originating from an electrical exchanger 4 and distributed by connection means 5. The rest of the unit which does not undergo the exceptional regeneration is not represented.

The case 2b represents the case where only 2 adsorbers 11 and 21 are disconnected to undergo the exceptional regeneration by circulation of a hot flow originating from an electrical exchanger 6. If the case 2b is compared to the case 2a given that two times less adsorbers are regenerated, the exchanger 6 will be two times less powerful than the exchanger 4 or, if it is as powerful, the regeneration will be faster. In this case also, the rest of the unit which does not undergo the exceptional regeneration is not represented.

The case 2c corresponds to another variant. Only one adsorber 11 is regenerated at a time with an electrical reheater 8 of minimum power. There are then 2 main options available with respect to the oxygen production unit. In the first case, a second adsorber forming part of the other group of adsorbers is isolated and/or disconnected and the VSA O2 continues to be operated with two groups of adsorbers each representing 5/6 of the initial volume. In the second case, the adsorber 11 is replaced with an additional adsorber constituting a spare adsorber. Nominal production is then maintained. In our example, this amounts to having a $13^{th}$ adsorber available, ready to be used. The cost overhead relative to the initial unit is then only a few percent. The choice between maintaining production or accepting a temporary lowering of performance levels is made based on economic criteria specific to the site. In this latter case, the oxygen production unit would be similar to that of FIG. 1, the adsorber 11 then being replaced by an additional adsorber.

The adsorbers that are regenerated can comprise either the guard bed intended to stop the moisture from the air and at least partially the carbon dioxide, and the zeolite intended for the N2/O2 separation, or possibly only the zeolite. In all cases according to the invention, only a maximum of a third of the adsorbers is regenerated at a time, that is to say, at most, a third of all of the adsorbent or of the zeolite.

The exceptional regeneration of the adsorbers by raising temperature is performed by the circulation of hot gas counter-current to the direction of introduction of the air in normal operation. The minimum temperature at the inlet of the subvolume will be 100° C. but substantially higher temperatures of the order of 250, or even of 350° C. and above will generally be used when the aim is to desorb moisture. It is possible to proceed by levels if necessary to avoid a hydrothermal aging of the adsorbents. A part of the moisture will be desorbed at moderate temperature, for example 150° C., while the last traces of water, in particular those located in the zeolite, will be eliminated for example at 380° C.

The regeneration gas used will be an essentially dry gas, air, oxygen, nitrogen or a mixture of these gases, with a dew point at atmospheric pressure lower than −30° C., preferentially lower than −50° C., more preferentially lower than −70° C. If possible, a decarbonated gas will be used, for example deriving from a unit for cryogenically separating gases from the air.

Given the temperature levels used and their possible swings during the regeneration procedure, the regeneration gas will preferentially be heated by means of an electrical reheater. In effect, given the same installed power, it will be possible to reheat a relatively high flow rate at an intermediate temperature and a lower flow rate at high temperature.

In order to limit the thermal losses, and protect the operating personnel, provision is made for the adsorbers to be able to be thermally insulated, this insulation, for example in the form of two half-shells, being at least put in place during decontamination.

The benefit of the invention is that this fractionated depollution is done locally, in proximity to the VSA O2 unit. The reheater will thus be able to be situated on the very location of the VSA O2 unit or further away on the site if there is an advantage like the proximity of a dry gas network, of a suitable electrical power supply, a shelter, etc. In most cases, it will be necessary to disconnect the adsorber that is to be cleaned and to transport it to the reheater. It is also possible to only have to disconnect the adsorber from the VSA O2 unit and regenerate it in situ, possibly by using a hot gas network provided for this purpose and capable of supplying each of the adsorbers by means of fixed or mobile lines.

The dry and decarbonated gas will be able to be used to hasten the cooling of the adsorber after its depollution.

Given its low power, the electrical reheater will be able to be transportable from one site to another. It will then be advantageous to provide a systematic servicing program for the different units instead of waiting for example for a lowering of performance levels on a site to launch the depollution operations.

There will therefore be a benefit in using identical adsorbers in the various VSA O2 units. Depending on the capacity sought, the number of adsorbers will be adapted to form the necessary total volume of adsorbent. In this way, it will be possible not only to use a single regeneration reheater but also a single additional adsorber which will be sufficient to keep all the VSA O2 units in service during their exceptional regeneration.

It has been seen that the adsorbers have to be
either isolatable from the VSA O2 unit and directly connectable to the reheater.
or isolatable from the VSA O2 unit and removable to be cleaned nearby.

In the latter case, there are two possibilities: the adsorber has its own jacket which withstands the pressure and the vacuum with appropriate connection means, or else, on the contrary, the adsorber is a removable element contained in a common enclosure which houses a plurality thereof. It may then be necessary, after having removed it from its housing, to place it in a special enclosure in order to regenerate it.

FIG. 3 illustrates these last points. FIG. 3a represents an adsorber 10 comprising an outer jacket 11 in which is housed the volume of adsorbent 13. The inlet/outlet nozzles referenced 12 make it possible to link this adsorber to these peer adsorbers to form the equivalent of a larger adsorber corresponding to an adsorber conventionally used in the prior art. This module is independent and can be directly regenerated after connection to the regeneration system. On the other hand, FIG. 3b represents a group of adsorbers 20 made up of 4 adsorbers 23, 24, 25, 26 placed in a same enclosure 21. The decontamination of the module 23 for example will a priori necessitate the availability of a suitable jacket in which it will have to be placed before connecting it to the regeneration system. FIG. 3c represents a jacket of this type (30). The adsorber being placed inside, the jacket is closed by means of a top cover (31) held in place by a flange system. The benefit of such a system is that the jacket of the group of adsorbers—21 in FIG. 3b—and the internal parts (distributor, support, etc.) do not have to be designed to withstand the high regeneration temperature.

From an economic point of view, these VSA O2 units will be dimensioned with 4 to 10 adsorbers operating in parallel per group, the number of groups, for its part, depending on the pressure cycle retained.

The invention will now be described in detail for a VSA O2 unit producing a flow rate of approximately 120 tons per day of oxygen counted as pure with a purity of 90% molar. The production must be available continuously and constantly at a pressure of 1.35 bar abs. The site is close to sea level and the local conditions correspond to a temperate zone with normal humidity. These are therefore conventional conditions for such a unit.

The cycle retained is a cycle with a high pressure of 1.50 bar abs and a low pressure close to 0.35 bar abs, comprising 4 phase times and therefore 4 groups of adsorbers, each formed by a group of identical adsorbers.

Groups of 5 adsorbers operating in parallel are used, that is to say 20 adsorbers in all, each module comprising a little more than 2m3 of adsorbent.

Figure 4:
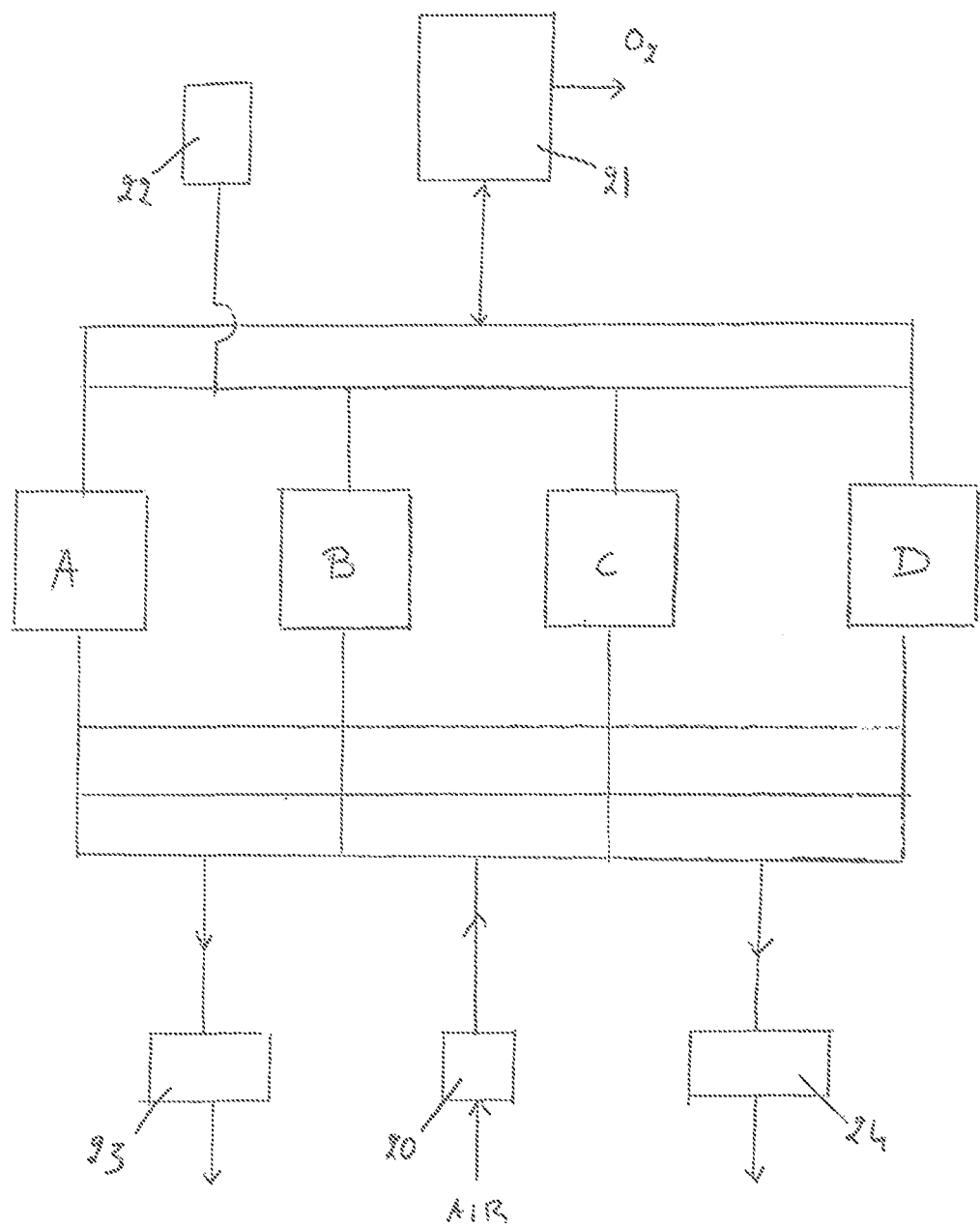
FIG. 4 illustrates a schematic representation of a VSA O2 unit, in accordance with one embodiment of the present invention.

The detailed description of the cycle is given below as an indication, the benefit of the invention obviously not being limited to this process, nor even to the implementation of 4 groups of adsorbers (A, B, C, D). FIG. 4 very schematically illustrates this VSA O2 unit.

more particularly on the optimization between performance levels, investment and simplicity. With the most effective adsorbents and powerful machines, it can be of the order of 0.3 KWh/Nm3 and yield a highly competitive cost for the oxygen.

As has already been written, the unit comprises four groups each of 5 identical adsorbers.

The adsorber takes the form of a cylindrical jacket with vertical axis enclosing 2 layers of adsorbents, that is to say, from bottom to top, approximately 0.20 m of activated alumina and 0.80 m of LILSX, zeolite which has preferably been deposited on an inert core.

As has already been stated, it is probable that, during operation, a small fraction of the CO2, of the nitrogen oxides and of the traces of hydrocarbons, the latter components possibly being less adsorbable than CO2, will migrate into the zeolite in the course of the cycles, affecting its performance levels with respect to the stopping of the nitrogen by a few percent. That is generally reflected in an increase in the specific energy, the production for its part remaining generally sufficient for the demand, the unit having been generally dimensioned with a certain margin. Furthermore, this slight lack of nitrogen adsorption capacity can also be compensated for example by a low pressure lower by a few millibar. If no measures are taken, the energy overhead will end up becoming significant but it counts mostly in the cost of the oxygen when the O2 production is high (from 120 t/d for example).

Similarly, despite the precautions taken, small ingresses of water at the zeolite level cannot be excluded, whether in the form of migration from the guard bed or intakes of atmospheric air at the various junctions when the adsorbent is in a vacuum.

| X | T1 (Prod) | T2 | T3 | X | X | X | T2 | T2 | T3 | T2 | T1 (Prod) |
|---|---|---|---|---|---|---|---|---|---|---|---|
| X | ⇑ | ⇑ | ⇑ | X | X | X | ⇓ | ⇓ | ⇓ | ⇓ | ⇓ |
| 1 | 2 | 3 | 4 | 5 | 6 | 7 | 8 | 9 | 10 | 11 | 12 |
| ⇑ | ⇑ | X | ⇓ | ⇓ | ⇓ | ⇓ | ⇓ | ⇓ | X | ⇑ | ⇑ |
| C-air | C-air | X | PAV1 | PAV1 | PAV1 | PAV2 | PAV2 | PAV2 | X | ATM | C-air |

First phase: a group of 5 adsorbers, corresponding for example to the group A, is repressurized by means of compressed air 1; when the pressure level sought is reached, the oxygen T1 is sent to a vessel referenced 21; the group of adsorbers, then isolated on the supply side, is depressurized on the production side supplying an oxygen-rich gas T2 also sent to a vessel referenced 22.

Second phase: this corresponds to the vacuum pumping by means of the first vacuum pump PAV1 referenced 23. Initially, a third oxygen-rich flow T3 (4) is recovered simultaneously by co-current decompression. The next two steps correspond to simply vacuum pumping (5 and 6).

Third phase: this corresponds to the implementation of the second vacuum pump PAV2 referenced 24 with continuation of the pumping (7) then elution with a part of the flow T2 (8 and 9).

Fourth phase: this corresponds to the repressurization of the 4$^{th}$ group of adsorbers, first of all by the flow T3 (10), then simultaneously by the flow T2 and atmospheric air (11) and finally by a flow extracted from the production T1 and by air from the compressor referenced 20 (12).

This is a particularly powerful cycle in which each of the adsorbers operates continuously. The specific energy depends essentially on the choice of these adsorbers and Provision has therefore been made, in order to keep the cost of production of the oxygen at a very low level, to be able to regenerate all of the adsorbent approximately every 24 months without having to increase the downtime necessary for the customary servicing (valves, machines, etc.) and without, obviously, having to replace the initial loads of said adsorbent.

To this end, the periodic presence of a mobile regeneration unit comprising a generator of dry air, decarbonated and free for the most part of the atmospheric impurities (NOx, unsaturated or C3+ type hydrocarbons, VOC, potential traces of various contaminants such as NH3, H2S, alcohols, etc.) and an electrical reheater with the appropriate control-command and safety systems is programmed long in advance in the unit maintenance and servicing process.

When the decontamination period has arrived, a procedure is applied that is intended to minimize the disturbances if there is a desire not to interrupt the oxygen production. That consists in switching to degraded mode operation, suited to operation with 80% of the volume of adsorbent. This is possibly reflected in the shortening of certain sub-steps in order to remain within operating zones that do not exhibit any particular problem. Through an increase in the specific energy, it will be possible to produce more than 90% of the nominal flow rate. Simultaneously, 4 adsorbers are isolated, one on each group of adsorbers. Each of these modules is in turn removed from the VSA O2 unit, connected to the regeneration system and decontaminated. The decontamination procedure is totally automatic, permanently monitored by the control-command system of the regeneration reheater. A first phase at a temperature of the order of 150° C. makes it possible to evacuate most of the secondary impurities and most of the water. The tracking of the temperature at the adsorber outlet, characteristic of the residual water content in the guard bed, makes it possible for example to go on to the next step which consists in increasing the temperature gradually to 350° C., in particular by lowering the regeneration gas flow rate. The duration of this phase can be preprogrammed, the quantity of residual water to be removed being very small and in practice not being involved in the heat balance. It is thus possible to raise only the zeolite to high temperature, leaving most of the guard bed at 150° C. as well as the bottom part of the module, thus limiting the thermal stresses on the supporting system. A cooling sequence then proceeds counter-current to the heating with purified air at ambient temperature until all the volume of zeolite is cooled. The end of the cooling can be done with atmospheric air in order to partially recharge the inlet of the guard bed with water and have an adsorber closer from this point of view to the adsorbers remaining in operation. The implementation in the cycle of an adsorber exhibiting a thermal behaviour different from those remaining in service, behaviour linked to an excessive adsorption of moisture during the first cycles following the return to service, is thus avoided. When the 4 decontaminated adsorbers are replaced in the unit and returned to service, it is possible to treat the next 4 and so on. Since the decontamination, the disconnections and reconnections of 4 adsorbers take approximately 48 h, the VSA O2 unit is totally decontaminated in two weeks. Given the transport times from one site to another, the regeneration system can treat ten or so units per year.

Figure 6:
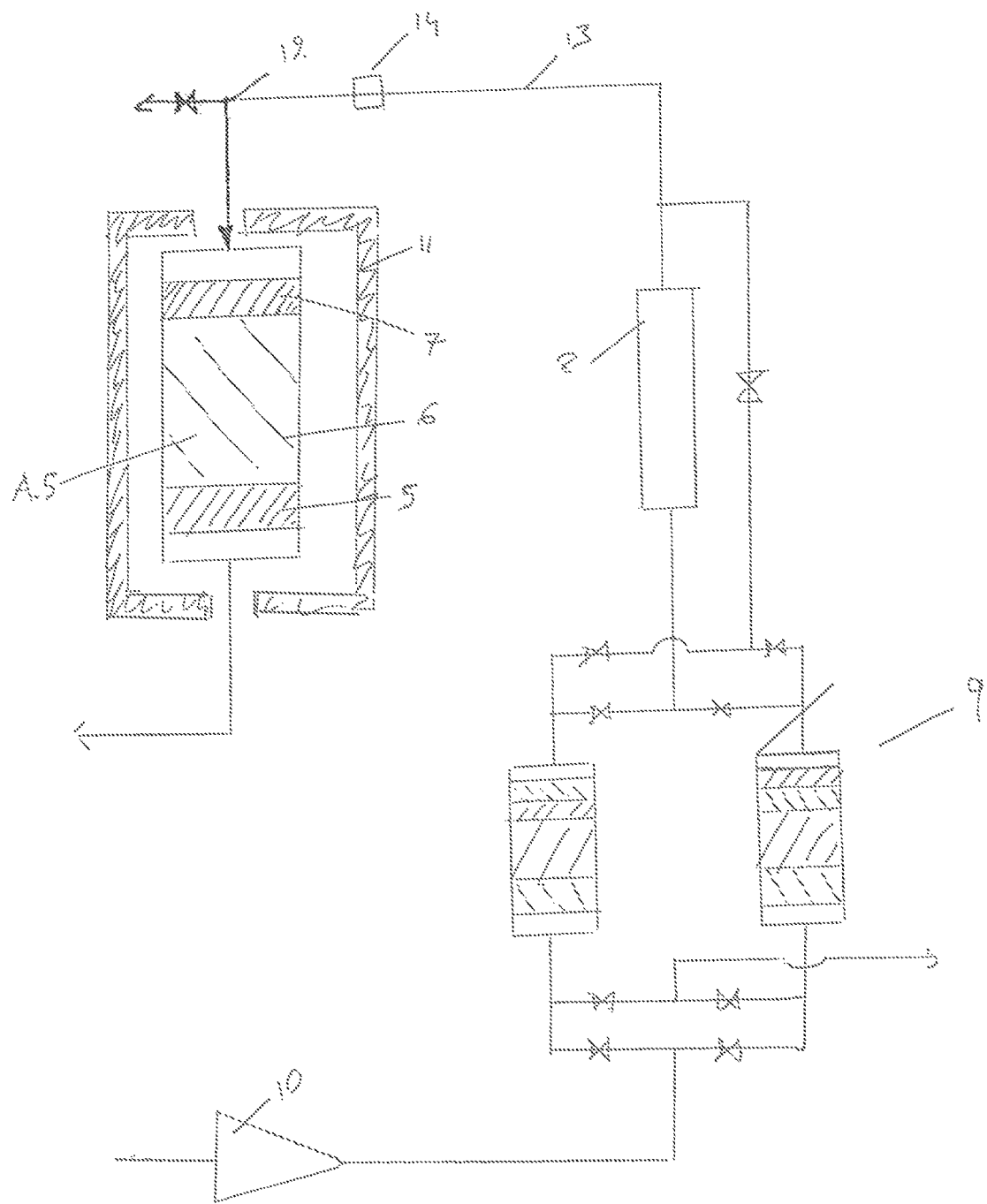
FIG. 6 illustrates a schematic representation of an adsorber connected to a heater, in accordance with one embodiment of the present invention.

FIGS. 5 and 6 illustrate the procedure described above.

The 5 adsorbers forming a group of adsorbers 1, for example the group A, are in practice arranged symmetrically in star configuration, but, to simplify understanding, they are aligned in FIG. 5a which corresponds to nominal operation: the 5 adsorbers (A.1 to A.5) operate in parallel as a single adsorber would do. They are connected to the air/nitrogen manifold 3 and to the oxygen manifold 2. The device referenced 4 represents a connection system that is vacuum-tight with respect to the atmosphere, that can be dismantled and locked. Here, it is a flanged on/off valve. The rest of the VSA O2 unit is not represented in the diagram. In FIG. 5b, the adsorber A.5 has been disconnected from the manifolds of the unit whereas the adsorbers A.1 to A.4 remain connected for their part to said manifolds and continue to follow the pressure cycle. In FIG. 6, the adsorber A.5 has been connected to the electrical reheater 8 which is itself supplied with dry gas, decarbonated and free of polluting secondary impurities for the zeolite of the VSA O2 unit. This gas is supplied by a purifying unit of TSA type 9 dimensioned for this purpose. This small unit will preferentially comprise activated alumina, zeolite 13 X and one or more layers of exchanged zeolite (calcium-exchanged, barium-exchanged, etc.).

The TSA is itself supplied with air by the compressor 10 at a pressure of the order of 3.5 bar abs. Suction filter, final refrigerant, etc. are not represented. The reference 11 corresponds to the thermal insulation system of the module being decontaminated. This is 2 removable insulating shells that can easily be fixed to the module. The reference 14 represents the connection system between the nozzle of the adsorber 12 and the nozzle 13 of the electrical reheater. That can be a simple fixing by flanges, etc. Pipelines, electrical reheater, TSA unit are also thermally insulated.

It was decided here to perform the decontamination adsorber by adsorber. The adsorbers A5, B5, C5, D5 that are decontaminated in succession one by one and then returned to service, are disconnected for example simultaneously. This same procedure is applied to the four adsorbers referenced 1 (A1, B1, C1, D1), then referenced 2 (A2, B2, etc.), 3 and 4. The VSA O2 unit continues to produce with 4 adsorbers out of 5 in service. By accepting a degraded specific energy, it will be possible to produce more than 110 t/d of oxygen but it will of course be preferable to perform the decontaminations, as has already been written, during periods when the oxygen demand is lower. They could of course be performed in downtime periods, for example for maintenance of the adsorbers, of the assisting compressors or of the vacuum pump.

It is of course possible to proceed differently, decontaminating several adsorbers at a time. If oxygen is to continue to be produced, it is nevertheless best to operate with the same volume of adsorbent per phase, that is to say in practice with the same number of adsorbers per group (here 4 preferably). It is also possible to have an additional replacement module as described above, then to use the decontaminated adsorber as additional replacement adsorber and so on.

The invention is limited to VSA O2 units because these are a type of unit very widely used presenting pollution risks proven through experience, pollution that substantially affects the performance levels, and implementing adsorbents that are expensive and difficult to regenerate. However, such an approach could also concern other applications, particularly those using vacuum during the cycle like some VSA CO2 or VSA CO or N2/CH4 separation units. The main point consists in being able to locally regenerate a small fraction of the total volume of adsorbent of said unit and to repeat this operation, if necessary, in order to regenerate all of this adsorbent multiple times.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An oxygen production process of VSA type from a flow of air, implementing at least one group of at least 3 adsorbers installed in parallel and following the same VSA cycle comprising, in succession, a phase of adsorption at the high pressure of the cycle, a phase of desorption at pressures lower than the high pressure of the cycle, a phase of repressurization of the adsorber to the high pressure of the cycle, wherein, periodically or exceptionally:
   a) at least one adsorber of the group of adsorbers is isolated so as to no longer follow the pressure cycle, wherein at most a third of the adsorbers of a group is isolated,
   b) the adsorbent contained in the adsorber isolated in the step a) is regenerated by raising the temperature, and
   c) the adsorber regenerated in the step b) is re-incorporated in the group of adsorbers so as to once again follow the pressure cycle.

2. The process of claim 1, wherein said process implements at least 2 groups of at least 3 adsorbers with the groups each following, in offset fashion, the same VSA cycle.

3. The process of claim 1, wherein said process implements removable means of connection to air flow, oxygen flow and residual flow circuits.

4. The process of claim 3, wherein the adsorbers are removable and, in the step a), the adsorber is isolated by displacement of said adsorber out of the unit formed by the group of at least 3 adsorbers.

5. The process of claim 3, wherein in the step a) the adsorber is isolated by disconnection of said adsorber with the removable means of connection to the air flow, oxygen flow and residual flow circuits, and in the step b) the adsorbent is regenerated locally.

6. The process of claim 1, wherein in the step b) the adsorbent is regenerated by circulation of a regeneration gas, counter-current to the direction of air circulation, at a temperature above 100° C.

7. The process of claim 6, wherein said regeneration gas is air, oxygen, nitrogen or a mixture of these gases with a dew point at atmospheric pressure lower than −30° C.

8. The process of claim 6, wherein the regeneration gas is heated to a temperature higher than 100° C. by means of an electrical reheater.

9. The process of claim 1, wherein said process implements an additional adsorber and in the step a) the additional adsorber is incorporated in the group of adsorbers so as to follow the pressure cycle in place of the isolated adsorber.

10. The process of claim 1, wherein in the step a) a single adsorber is isolated and the steps a), b) and c) have a total duration of between 8 h and 48 h.

11. The process of claim 1, wherein the adsorbers implemented consist of a barrel comprising at least one particular adsorbent or at least one contactor with parallel passages, with said barrel having a diameter of between 0.5 and 2.5 m.

12. The process of claim 1, wherein the high pressure of the cycle lies between $1\times10^5$ Pa and $1.55\times10^5$ Pa.

13. The process of claim 1, wherein said process makes it possible to produce between 5 t/d and 240 t/d of oxygen.

\* \* \* \* \*